United States Patent
Luo et al.

(10) Patent No.: US 12,287,749 B2
(45) Date of Patent: Apr. 29, 2025

(54) DRIVING CIRCUIT, ELECTRONIC DEVICE AND COMMUNICATION METHOD THEREFOR

(71) Applicants: Chongqing BOE Optoelectronics Technology Co., Ltd., Chongqing (CN); BOE TECHNOLOGY GROUP CO., LTD., Beijing (CN)

(72) Inventors: Zhongli Luo, Beijing (CN); Kangpeng Dang, Beijing (CN); Cheng Zuo, Beijing (CN); Hong Chen, Beijing (CN); Xiong Guo, Beijing (CN); Bo Wang, Beijing (CN); Kuan Li, Beijing (CN); Yaokun Zheng, Beijing (CN); Ming Gao, Beijing (CN); Yuansheng Tang, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/245,945

(22) PCT Filed: Apr. 13, 2022

(86) PCT No.: PCT/CN2022/086675
§ 371 (c)(1),
(2) Date: Mar. 20, 2023

(87) PCT Pub. No.: WO2023/197216
PCT Pub. Date: Oct. 19, 2023

(65) Prior Publication Data
US 2024/0354273 A1 Oct. 24, 2024

(51) Int. Cl.
*G06F 13/42* (2006.01)
*G06F 13/40* (2006.01)

(52) U.S. Cl.
CPC ...... *G06F 13/4072* (2013.01); *G06F 13/4022* (2013.01); *G06F 13/4291* (2013.01)

(58) Field of Classification Search
CPC ............. G06F 13/4072; G06F 13/4022; G06F 13/4291
(Continued)

(56) References Cited

U.S. PATENT DOCUMENTS 10,061,439 B2 * 8/2018 Yamanaka ............ G06F 1/3262
10,540,647 B2 * 1/2020 Park ........................ G06F 21/00
(Continued)

FOREIGN PATENT DOCUMENTS

| CN | 102707790 A | 10/2012 |
| CN | 110557263 A | 12/2019 |

(Continued)

*Primary Examiner* — Christopher B Shin
(74) *Attorney, Agent, or Firm* — IP & T GROUP LLP

(57) ABSTRACT

A driving circuit includes a driver board and a slave processor. The driver board is configured to drive a touch panel of an electronic device. The slave processor is coupled to the driver board, and is configured to receive a control command including a first address when the driver board is in a power-off state, and send first response information in response to the control command. The driver board and the slave processor share the first address.

16 Claims, 3 Drawing Sheets

(58) Field of Classification Search
USPC .......................................................... 710/305
See application file for complete search history.

(56) References Cited

U.S. PATENT DOCUMENTS

| | | | | |
|---|---|---|---|---|
| 11,789,514 | B2* | 10/2023 | Yu | ............................ H04L 67/56 |
| | | | | 713/310 |
| 2007/0046618 | A1* | 3/2007 | Imai | ...................... G06F 1/3265 |
| | | | | 345/102 |
| 2009/0197615 | A1* | 8/2009 | Kim | ................... H04W 52/027 |
| | | | | 455/456.1 |
| 2009/0289908 | A1* | 11/2009 | Chen | ...................... G06F 1/3203 |
| | | | | 345/173 |
| 2011/0098019 | A1* | 4/2011 | Fujii | ................. H04W 52/0277 |
| | | | | 455/411 |
| 2011/0254784 | A1* | 10/2011 | Yamada | ..................... G06F 1/32 |
| | | | | 345/173 |
| 2012/0044158 | A1* | 2/2012 | Chang | ....................... G06F 8/71 |
| | | | | 345/173 |
| 2013/0113727 | A1* | 5/2013 | Lin | ....................... G06F 1/3287 |
| | | | | 345/173 |
| 2013/0117489 | A1 | 5/2013 | Doshi et al. | |
| 2014/0145985 | A1* | 5/2014 | Akai | ..................... G06F 3/04166 |
| | | | | 345/173 |
| 2014/0145986 | A1* | 5/2014 | Kuroiwa | ................ G06F 3/0446 |
| | | | | 345/173 |
| 2014/0191987 | A1* | 7/2014 | Lin | ....................... G09G 3/2096 |
| | | | | 345/173 |
| 2014/0191994 | A1* | 7/2014 | Chung | ................. G06F 3/04166 |
| | | | | 345/173 |
| 2014/0191999 | A1* | 7/2014 | Kim | ...................... G06F 1/3262 |
| | | | | 345/173 |
| 2015/0199102 | A1* | 7/2015 | Koh | .................. G06F 3/041661 |
| | | | | 715/835 |
| 2017/0153690 | A1* | 6/2017 | Chen | ...................... G06F 1/3262 |
| 2018/0246452 | A1* | 8/2018 | Funakawa | .......... H04N 1/00411 |
| 2019/0129875 | A1* | 5/2019 | Chard | ................. G06F 13/4282 |
| 2021/0081021 | A1 | 3/2021 | Yu | |

FOREIGN PATENT DOCUMENTS

| | | |
|---|---|---|
| KR | 20150079318 A | 7/2015 |
| TW | 200708931 A | 3/2007 |
| TW | I459289 B | 11/2014 |

* cited by examiner

DRIVING CIRCUIT, ELECTRONIC DEVICE AND COMMUNICATION METHOD THEREFOR

CROSS-REFERENCE TO RELATED APPLICATION

This application is a national phase entry under 35 USC 371 of International Patent Application No. PCT/CN2022/086675 filed on Apr. 13, 2022, which is incorporated herein by reference in its entirety.

TECHNICAL FIELD

The present disclosure relates to the field of display technology, and in particular, to a driving circuit, an electronic device, and a communication method therefor.

BACKGROUND

An inter-integrated circuit (I2C) bus is a bi-directional synchronous serial bus, consisting of a system clock line (SCL) and a serial data line (SDA). The I2C bus is widely used in the communication field due to the advantages of few signal lines, low power consumption, strong anti-interference and the like.

Generally, the I2C bus is used to connect a master device and slave devices. The master device is a device for controlling information flow, which may search for slave device (s) required by address, where each slave device has a fixed address. If the master device is to send data to a slave device, the master device first addresses the slave device, then sends the data to the slave device, and finally terminates the data transmission by itself. If the master device is to receive data from a slave device, the master device first addresses the slave device, then receives the data from the slave device, and finally terminates the reception process by itself.

SUMMARY

In an aspect, a driving circuit is provided. The driving circuit includes a driver board and a slave processor. The driver board is configured to drive a touch panel of an electronic device. The slave processor is coupled to the driver board, and is configured to receive a control command including a first address when the driver board is in a power-off state, and send first response information in response to the control command. The driver board and the slave processor share the first address.

In some embodiments, the driving circuit further includes a master processor, and the master processor is respectively coupled to the driver board and the slave processor. The control command includes at least one of a touch turn-off command or a touch turn-on command. The touch turn-off command is used to turn off a touch function of the touch panel of the electronic device, and the touch turn-on command is used to turn on the touch function of the touch panel of the electronic device. The master processor is configured to send the touch turn-off command when the electronic device is in a sleep mode, or send the touch turn-on command when the electronic device is in a working mode.

In some embodiments, the slave processor is further configured to enter a sleep mode from the processor when the driver board is in a power-on state.

In some embodiments, the slave processor is coupled to the driver board through a first port thereof. The slave processor is further configured to determine that the driver board is in the power-off state when a signal of the first port is a first signal, and determine that the driver board is in a power-on state when the signal of the first port is a second signal.

In some embodiments, the first signal is at a low level, and the second signal is at a high level.

In some embodiments, the first address includes an inter-integrated circuit (I2C) bus address.

In some embodiments, a power supply of the driver board is different from a power supply of the slave processor.

In another aspect, an electronic device is provided. The electronic device includes a touch panel, and the driving circuit according to any of the above embodiments. The touch panel is coupled to the driver board.

In yet another aspect, a communication method for an electronic device is provided, including: firstly, sending a touch turn-off command to a driver board of the electronic device when the electronic device enters a sleep mode, the touch turn-off command being used to turn off a touch function of a touch panel of the electronic device; then, controlling the driver board to be powered off after a first preset time from sending the touch turn-off command; and receiving second response information from the driver board before the driver board is powered off, the second response information being sent by the driver board in response to the touch turn-off command.

In some embodiments, the first preset time is related to at least one of an image refresh time, a driver board command parsing time, or a register initialization time.

In some embodiments, the first preset time is greater than or equal to a sum of the image refresh time, the driver board command parsing time, and the register initialization time.

In some embodiments, the first preset time is greater than or equal to 20 ms.

In some embodiments, the communication method for the electronic device further includes: firstly, controlling the driver board to be powered on when the electronic device enters a working mode; then, sending a touch turn-on command to the driver board of the electronic device after a second preset time from the driver board is powered on, the touch turn-on command being used to turn on the touch function of the touch panel of the electronic device; and then receiving third response information from the driver board, the third response information being sent by the driver board in response to the touch turn-on command.

In some embodiments, the second preset time is related to at least one of a driver board initialization time or a register initialization time.

In some embodiments, the second preset time is greater than or equal to a sum of the driver board initialization time and the register initialization time.

In some embodiments, the second preset time is greater than or equal to 100 ms.

In yet another aspect, a non-transitory computer-readable storage medium is provided. The non-transitory computer-readable storage medium has stored computer program instructions that, when executed on a computer (for example, a notebook computer), cause the computer to perform the communication method for the electronic device according to any of the above embodiments.

In some embodiments, firstly, the computer sends a touch turn-off command to the driver board of the computer in response to an operation causing the computer to enter a sleep mode, where the touch turn-off command is used to turn off a touch function of a touch panel of the computer. Then, the computer controls the driver board to be powered off after a first preset time from sending the touch turn-off command. Finally, the computer receives second response information from the driver board before the driver board is powered off, where the second response information is sent by the driver board in response to the touch turn-off command.

In yet another aspect, a computer program product is provided. The computer program product includes computer program instructions which are stored in a non-transitory readable storage medium, and when the computer program instructions are executed on a computer (for example, a notebook computer), the computer program instructions cause the computer to perform the communication method for the electronic device according to any of the above embodiments.

In yet another aspect, a computer program is provided. When the computer program is executed on a computer (for example, a notebook computer), the computer program causes the computer to perform the communication method for the electronic device according to any of the above embodiments.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person having ordinary skill in the art can obtain other drawings according to these accompanying drawings. In addition, the accompanying drawings to be described below may be regarded as schematic diagrams, and are not limitations on an actual size of a product, an actual process of a method and an actual timing of a signal involved in the embodiments of the present disclosure.

DETAILED DESCRIPTION

Figure 1:
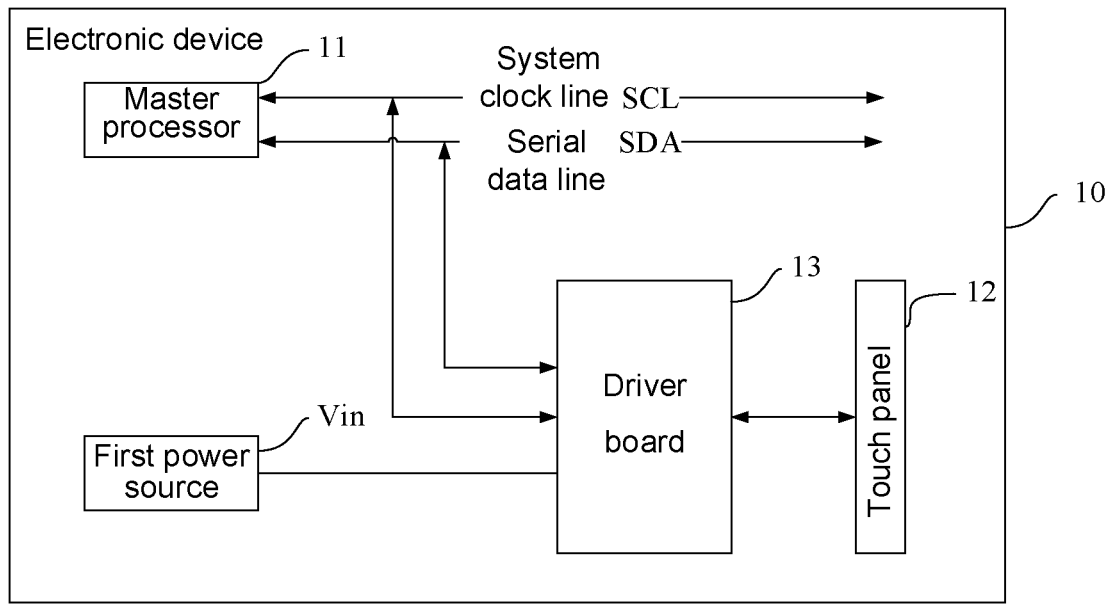
FIG. 1 is a structural diagram of an electronic device, in accordance with some embodiments.

Technical solutions in some embodiments of the present disclosure will be described clearly and completely with reference to the accompanying drawings below. Obviously, the described embodiments are merely some but not all embodiments of the present disclosure. All other embodiments obtained by a person having ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed in an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above term do not necessarily refer to the same embodiment(s) or example(s). In addition, specific features, structures, materials or characteristics may be included in any one or more embodiments or examples in any suitable manner.

Hereinafter, the terms such as "first" and "second" are used for descriptive purposes only, but are not to be construed as indicating or implying the relative importance or implicitly indicating the number of indicated technical features. Thus, the features defined with "first" and "second" may explicitly or implicitly include one or more of the features. In the description of the embodiments of the present disclosure, the term "a plurality of/the plurality of" means two or more unless otherwise specified.

In the description of some embodiments, "coupled" and "connected" and derivatives thereof may be used. For example, the term "connected" may be used in the description of some embodiments to indicate that two or more components are in direct physical or electrical contact with each other. As another example, the term "coupled" may be used in the description of some embodiments to indicate that two or more components are in direct physical or electrical contact. However, the terms "coupled" or "communicatively coupled" may also mean that two or more components are not in direct contact with each other, but still co-operate or interact with each other. The embodiments disclosed herein are not necessarily limited to the content herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The use of "adapted to" or "configured to" herein is meant to be an open and inclusive language that does not exclude devices suitable or configured to perform additional tasks or steps.

In addition, use of "based on" means open and inclusive, as the process, step, calculation, or other action "based on" one or more of the stated conditions or values may in practice be based on additional conditions or beyond the recited values.

Exemplary embodiments are described herein with reference to sectional views and/or plan views as idealized exemplary drawings. In the accompanying drawings, thicknesses of layers and areas of regions are enlarged for clarity. Thus, variations in shape with respect to the accompanying drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region shown to have a rectangular shape generally has a feature of being curved. Therefore, the regions shown in the accompanying drawings are schematic in nature, and their shapes are not intended to show actual shapes of regions in an apparatus, and are not intended to limit the scope of the exemplary embodiments.

Generally, in an electronic device, a master device and a slave device may be connected through an inter-integrated circuit (I2C) bus. As shown in FIG. 1, an electronic device 10 includes a master processor 11, a touch panel (TP) 12 and a driver board 13. The master processor 11 is coupled to the touch panel 12 through the driver board 13.

In some embodiments, the driver board 13 is configured to drive the touch panel 12 to carry out a display function and a touch function thereof, and the driver board 13 may be powered by a first power source Vin. When the first power source Vin is powered on, the driver board 13 is in a power-on state, and the display function and the touch function of the touch panel 12 may be carried out. When the first power source Vin is powered down, the driver board 13 is in a power-off state, and the display function of the touch panel 12 is turned off.

In some embodiments, the master device in the electronic device may include a master processor 11 (e.g., a central processing unit (CPU)), the slave device in the electronic device may include the driver board 13, and the master processor 11 and the driver board 13 are connected through an I2C bus. For example, the master processor 11 and the driver board 13 are connected through an I2C bus consisting of a system clock line SCL and a serial data line SDA. It can be understood that there also are a plurality of slave devices in the electronic device. That is, the slave devices in the electronic device may further include other devices other than the driver board 13. The master device and the slave device in the electronic device are both not limited in the aspect of number and type in the present disclosure.

Considering example in which the electronic device is a notebook computer (NB), a communication process between the master processor 11 and the driver board 13 in the notebook computer will be described below.

Figure 2:
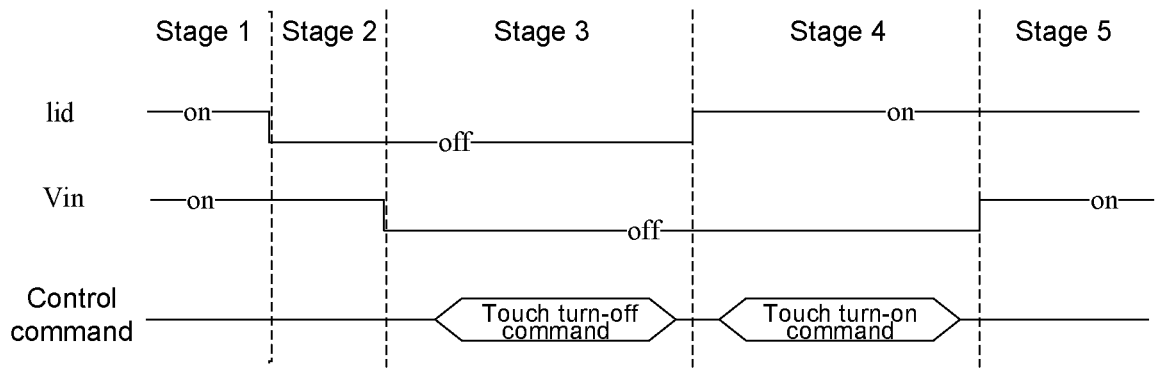
FIG. 2 is a communication timing diagram of an electronic device, in accordance with some embodiments.

With reference to FIG. 1, as shown in FIG. 2, in a first stage (stage 1), a cover plate of the notebook computer is in an open state (lid on), the first power source Vin is in a power-on state (on), and the driver board 13 is in a power-on state. In a second stage (stage 2), the cover plate of the notebook computer is closed (lid off), and the notebook computer enters the sleep mode. In a third stage (stage 3), the master processor 11 controls the first power source Vin to be powered down (off); after the first power source Vin is powered down, the driver board 13 is in a power-off state, and the display function of the touch panel 12 is turned off. The master processor 11 sends a touch turn-off command to the driver board 13, where the touch turn-off command is used to turn off the touch function of the touch panel 12. When the master processor 11 sends the touch turn-off command to the driver board 13, the first power source Vin has been powered down, that is, the driver board 13 cannot work because the driver board 13 has been powered off, and therefore the driver board 13 cannot respond to the touch turn-off command sent by the master processor 11 (that is, the slave device cannot respond), which causes the master processor 11 not to receive the response of the driver board 13 and consider the driver board 13 to be abnormal.

With reference to FIG. 1, as shown in FIG. 2, in a fourth stage (stage 4), the cover plate of the notebook computer is opened (lid on), and the notebook computer exits the sleep mode and enters the working mode. The master processor 11 sends a touch turn-on command to the driver board 13, where the touch turn-on command is used to turn on the touch function of the touch panel 12. In a fifth stage (stage 5), the master processor 11 controls the first power source Vin to be powered on, and the driver board 13 is in the power-on state after the first power source Vin is powered on. In the fourth stage, when the master processor 11 sends the touch turn-on command to the driver board 13, the first power source Vin is not powered on, at this time, the driver board 13 cannot work because the driver board 13 is not powered on, and therefore, the driver board 13 cannot respond to the touch turn-on command sent by the master processor 11 (that is, the slave device cannot respond), which causes the master processor 11 not to receive the response of the driver board 13 and consider the driver board 13 is abnormal. In other words, after the notebook computer exits from the sleep mode to enter the working mode, because the master processor 11 does not receive the response of the driver board 13, the master processor 11 may fail to identify the driver board 13 at a device manager, and will not read a data packet and enumeration information generated by the driver board 13, thereby causing the master processor 11 and the driver board 13 to fail to communicate normally. The enumeration information generated by the driver board 13 refers to data generated by the driver board 13. Typically, the enumeration information is a type of data with a defined a range of values.

To this end, some embodiments of the present disclosure provide a driving circuit, and an electronic device having the driving circuit may be a device including a touch panel, such as a mobile phone, a tablet computer, a desktop, a laptop, a handheld computer, a notebook computer, an ultra-mobile personal computer (UMPC), a netbook, a cellular phone, a personal digital assistant (PDA), an augmented reality (AR) device, or a virtual reality (VR) device. The embodiments of the present disclosure do not particularly limit the specific form of the electronic device. In the following embodiments, considering example in which the electronic device is a notebook computer, the solution provided in the embodiments of the present disclosure is illustrated exemplarily.

Figure 3:
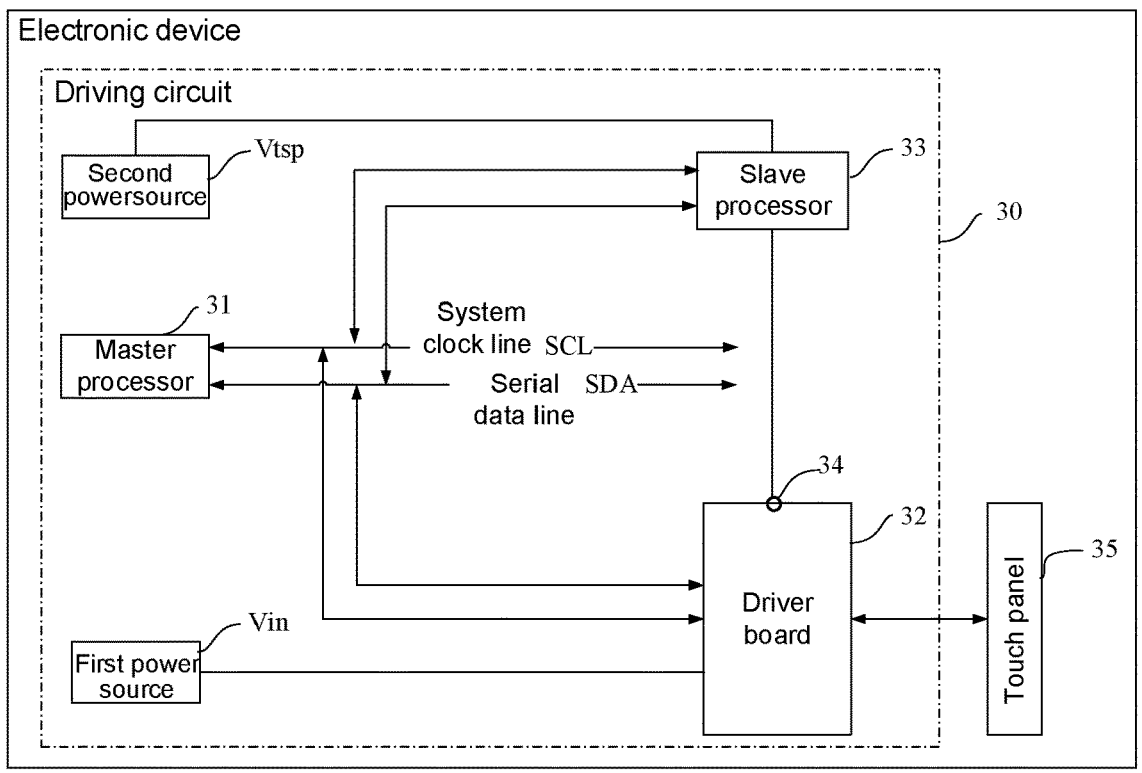
FIG. 3 is a structural diagram of an electronic device and a driving circuit thereof, in accordance with some embodiments.

As shown in FIG. 3, the driving circuit 30 includes a master processor 31, a driver board 32 and a slave processor 33, the master processor 31 is respectively coupled to the driver board 32 and the slave processor 33, the driver board 32 includes a first port 34, and the driver board 32 is coupled to the slave processor 33 through the first port 34.

The driver board 32 is configured to drive a touch panel 35 of the electronic device.

In some embodiments, as shown in FIG. 3, the driver board 32 is configured to be coupled to the touch panel 35 of the electronic device, and the driver board 32 may drive the touch panel 35 to carry out a touch function thereof, also may drive the touch panel 35 to carry out a display function thereof. The driver board 32 may be powered by a first power source Vin.

Exemplarily, the driver board 32 includes a touch timing controller (TTCON), and the TTCON includes a timing controller (TCON) and a micro controller unit (MCU). The TTCON is configured to drive the touch panel 35 to carry out the touch function thereof.

In some embodiments, the driver board 32 is further configured to process display data, generate a time synchronization signal (Tsync) for defining a display signal and a touch signal, generate a waveform of a gate driver on array (GOA) signal of an array substrate of a display screen, receive and process touch information, generate a control signal of a source/read-out integrated circuit (SRIC) in a touch stage, and generate a control signal of a touch modulation level shift integrated circuit (TMLS).

In some embodiments, the first port 34 is a general purpose input/output (GPIO) port, and a specific type of the first port 34 is not limited in the present disclosure. When the first power source Vin is in a power-down state, a signal of the first port 34 is a first signal. When the first power source Vin is in a power-on state, the signal of the first port 34 is a second signal. In the embodiments of the present disclosure, level types of the first signal and the second signal are not limited. In the following embodiments, considering example in which the first signal is a low level signal while the second signal is a high level signal, the solution provided in the embodiments of the present disclosure is illustrated exemplarily.

Exemplarily, as shown in FIG. 2, in the third stage, when the electronic device enters the sleep mode, the master processor 31 controls the first power source Vin to be powered down, the driver board 32 is in a power-off state after the first power source Vin is powered down, and the first port 34 is at a low level. In the fifth stage, when the electronic device enters the working mode, the master processor 31 controls the first power source Vin to be powered on, the driver board 32 is in a power-on state after the first power source Vin is powered on, and the first port 34 is at a high level.

In some embodiments, the master processor 31 may be respectively coupled to the driver board 32 and the slave processor 33 through a communication bus. It will be noted that the type of the communication bus connected between the master processor 31 and both the driver board 32 and the slave processor 33 is not limited in the present disclosure. The following embodiments are described considering example in which the communication bus is an I2C. For example, as shown in FIG. 3, the master processor 31 is respectively connected to the driver board 32 and the slave processor 33 through an I2C bus consisting of a SCL and a SDA.

The master processor 31 is configured to send a control command including a first address. The control command includes at least one of a touch turn-off command or a touch turn-on command, where the touch turn-off command is used to turn off a touch function of the touch panel 35 of the electronic device, while the touch turn-on command is used to turn on the touch function of the touch panel 35 of the electronic device.

In some embodiments, the master processor 31 is configured to, send the touch turn-off command including the first address when the electronic device is in the sleep mode, or send the touch turn-on command including the first address when the electronic device is in the working mode.

For example, as shown in FIG. 2, in the third stage, the electronic device is in the sleep mode, and the master processor 31 may send the touch turn-off command including the first address to the slave device; in the fourth stage, the electronic device is in the working mode, and the master processor 31 may send the touch turn-on command including the first address to the slave device.

The slave processor 33 is configured to, receive the control command, including the first address, from the master processor 31 when the driver board 32 is in the power-off state, and send first response information to the master processor 31 in response to the control command.

The driver board 32 and the slave processor 33 share the first address. The type of the first address is not limited in the present disclosure, which is related to the type of the communication bus connected between the master device and the slave device.

Considering example in which the communication bus is an I2C bus, the first address may be an I2C address. Since the driver board 32 and the slave processor 33 share the same I2C address, as for the master processor 31, the driver board 32 and the slave processor 33 are regarded as a same slave device. In this way, when the master processor 31 sends the control command including the first address to the slave device, if the driver board 32 is in the power-off state, the slave processor 33 acting as the slave device to the master processor 31 may send the first response information to the master processor 31 in response to the control command.

With reference to FIG. 3, as shown in FIG. 2, in the second stage, when the notebook computer enters the sleep mode, the master processor 31 controls the first power source Vin to be powered down, the driver board 32 is in the power-off state after the first power source Vin is powered down, and the display function of the touch panel is turned off. In the third stage, when the master processor 31 sends the touch turn-off command for turning off the touch function of the touch panel 35 to a slave device with the first address as an address thereof, although the driver board 32 is in the power-off state, since the driver board 32 and the slave processor 33 share the first address, as for the master processor 31, the slave processor 33 and the driver board 32 are regarded as the same slave device. Therefore, the slave processor 33 may receive the touch turn-off command sent by the master processor 31, and send the first response information to the master processor 31. In this way, since the master processor 31 may receive the first response information from the slave device (the slave processor 33), it is not considered that the driver board 32 is abnormal.

With reference to FIG. 3, as shown in FIG. 2, in the fourth stage, when the notebook computer exits the sleep mode and enters the working mode, the master processor 31 sends the touch turn-on command for turning on the touch function of the touch panel 35 to the slave device with the first address as the address thereof. In the fifth stage, the master processor 31 controls the first power source Vin to be powered on, and the driver board 32 is in the power-on state after the first power source Vin is powered on. In the fourth stage, when the master processor 31 sends the touch turn-on command to the driver board 32, the first power source Vin is not powered on, that is, the driver board 32 cannot respond to the touch turn-on command because it is not powered on. However, since the slave processor 33 and the driver board 32 share the first address, as for the master processor 31, the slave processor 33 and the driver board 32 are regarded as the same slave device, so the slave processor 33 may receive the touch turn-on command sent by the master processor 31, and send the first response information to the master processor 31. In this way, since the master processor 31 may receive the first response information from the slave device (the slave processor 33), it is not considered that the driver board 32 is abnormal. As a result, the master processor 31 and the driver board 32 may normally communicate after the first power source Vin is powered up.

It can be understood that since the driver board 32 and the slave processor 33 share the same I2C address, as for the master processor 31, the driver board 32 and the slave processor 33 are regarded as the same slave device. Therefore, when the master processor 31 sends the control command to the slave device, if the driver board 32 is in the power-off state and cannot respond to the control command sent by the master processor 31, the slave processor 33 may respond to the control command sent by the master processor 31. In this way, the problem that the master processor 11 and the driver board 13 cannot normally communicate because the driver board 32 cannot respond to the control command sent by the master processor 31 may be solved.

In some embodiments, the slave processor 33 is further configured to, enter a sleep mode when the driver board 32 is in the power-on state, and enter a working mode when the driver board 32 is in the power-off state. It can be understood that, when the driver board 32 is in the power-on state, the master processor 31 and the driver board 32 may normally communicate with each other, in this case, the slave processor 33 enters the sleep mode, which helps reduce energy consumption of the electronic device. When the driver board 32 is in the power-off state, since the slave processor 33 enters the working mode, if the master processor 31 sends the control command, the slave processor 33 acting as the slave device sharing the same I2C address as the driver board 32 may respond to the control command sent by the master processor 31, thereby ensuring that the master processor 31 and the slave device may normally communicate with each other.

In some embodiments, the slave processor 33 is further configured to, determine that the driver board 32 is in the power-off state when the signal of the first port 34 is the first signal, and determine that the driver board 32 is in the power-on state when the signal of the first port 34 is the second signal.

Exemplarily, as shown in FIG. 2, in the second stage, when the electronic device enters the sleep mode, the master processor 31 controls the first power source Vin to be powered down, the driver board 32 is in the power-off state after the first power source Vin is powered down, the first port 34 is at a low level (that is, the first signal), and when the slave processor 33 determines that the driver board 32 is in the power-off state, the slave processor 33 enters the working mode. In the fifth stage, when the electronic device enters the working mode, the master processor 31 controls the first power source Vin to be powered on, the driver board 32 is in the power-on state after the first power source Vin is powered on, the first port 34 is at a high level (i.e., the second signal), and when the slave processor 33 determines the driver board 32 is in the power-on state, the slave processor 33 enters the sleep mode.

In some embodiments, the slave processor 33 may be an MCU. The type of the slave processor 33 is not limited in the present disclosure.

It will be noted that, in the driving circuit provided by the present disclosure, the slave processor 33 sharing the same address with the driver board 32 is provided. When the driver board 32 is in the power-on state, the slave processor 33 enters the sleep mode, and the driver board 32 responds to the control command sent by the master processor 31. When the driver board 32 is in the power-off state, the slave processor 33 enters the working mode, and the slave processor 33 responds to the control command sent by the master processor 31. That is, when the master processor 31 sends the control command, no matter whether the driver board 32 is in the power-on state, the master processor 31 may receive the response information from the slave device (the driver board 32 or the slave processor 33) to ensure the communication between the master processor 31 and the driver board 32 is normal.

In some embodiments, as shown in FIG. 3, a power supply of the driver board 32 is a first power source Vin, and a power supply of the slave processor 33 is a second power source Vtsp, where the first power source Vin and the second power source Vtsp are different. It can be understood that the description "the first power source Vin and the second power source Vtsp being different" means that switching circuits of the master processor 31 for controlling the first power source Vin to be powered on and off and for controlling the second power source Vtsp to be powered on and off are different, so that the first power source Vin and the second power source Vtsp may be powered on and off separately. In this way, when the driver board 32 is in the power-off state, the slave processor 33 will not be powered off.

For example, the master processor 31 is coupled to the driver board 32 through a first switching circuit, and the master processor 31 is coupled to the slave processor 33 through a second switching circuit. The master processor 31 may realize the power-on or power-off of the first power source Vin by controlling the turn-on and turn-off of the first switching circuit, and the master processor 31 may realize the power-on or power-off of the second power source Vtsp by controlling the turn-on and turn-off of the second switching circuit. Therefore, the first power source Vin and the second power source Vtsp can be powered on and off separately.

Figure 4:
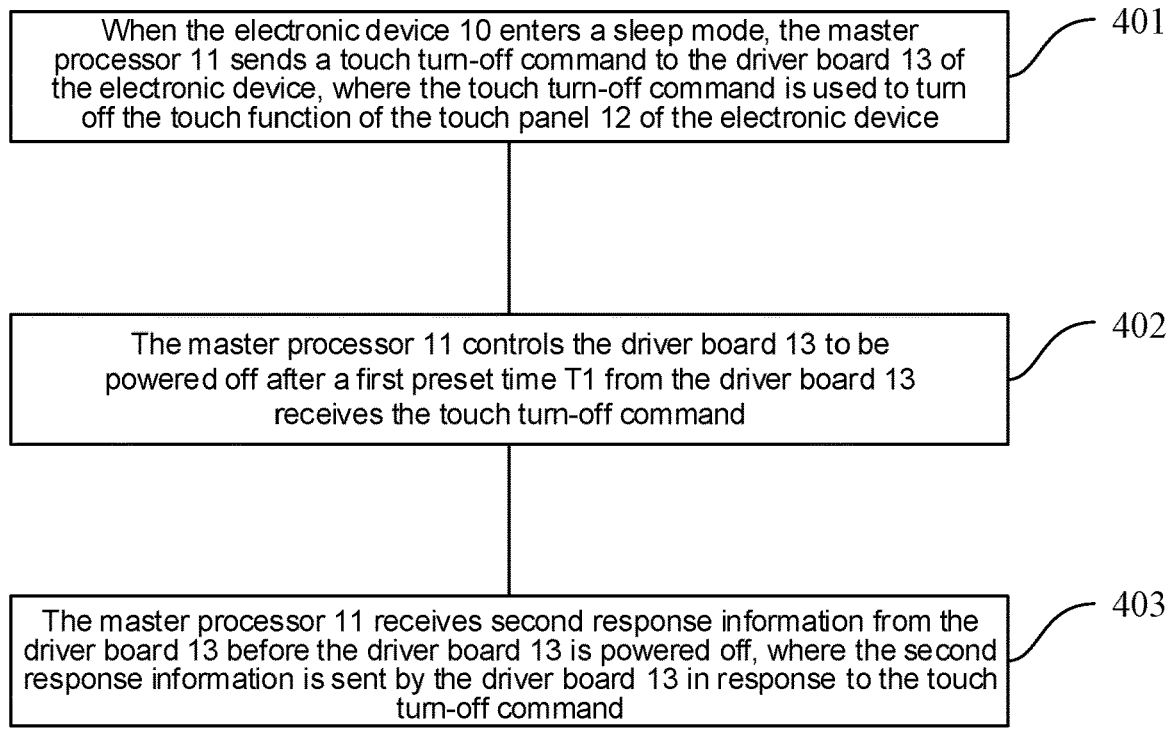
FIG. 4 is a flowchart of a communication method for an electronic device, in accordance with some embodiments.

Some embodiments of the present disclosure provide a communication method for an electronic device, which may be the electronic device 10 shown in FIG. 1. In combination with FIG. 1, as shown in FIG. 4, the method includes the following steps.

In step 401, when the electronic device 10 enters a sleep mode, the master processor 11 sends a touch turn-off command to the driver board 13 of the electronic device, where the touch turn-off command is used to turn off the touch function of the touch panel 12 of the electronic device.

Figure 5:
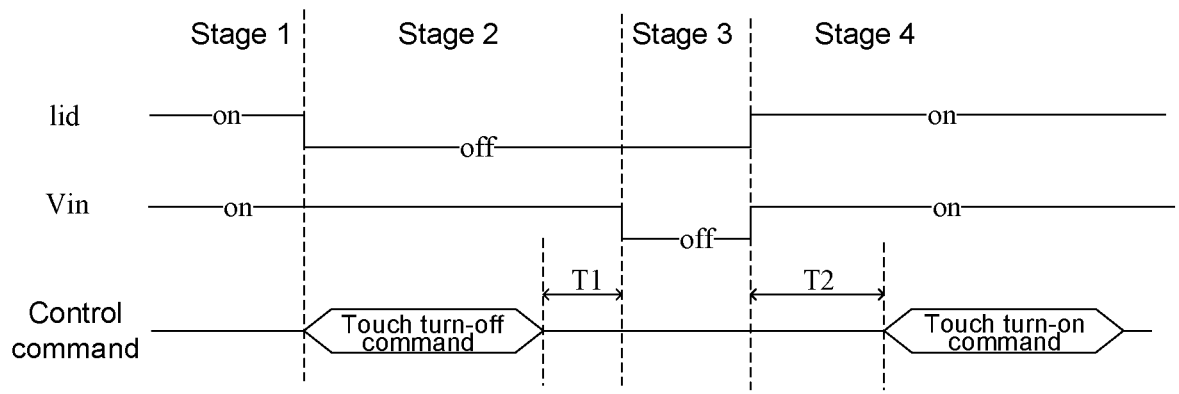
FIG. 5 is a communication timing diagram of another electronic device, in accordance with some embodiments.

Exemplarily, with reference to FIG. 1, as shown in FIG. 5, considering example in which the electronic device is a notebook computer, in a first stage (stage 1), the cover plate of the notebook computer is in an open state (lid on), the first power source Vin is in a power-on state (on), and the driver board 13 is in a power-on state. In a second stage (stage 2), the master processor 11 sends a touch turn-off command for turning off the touch function of the touch panel 12 of the electronic device to the driver board 13.

In step 402, the master processor 11 controls the driver board 13 to be powered off after a first preset time T1 from the driver board 13 receives the touch turn-off command.

With reference to FIG. 1, as shown in FIG. 5, in the second stage, since the master processor 11 controls the driver board 13 to be powered off after the first preset time T1 from the driver board 13 receives the touch turn-off command, when the master processor 11 sends the touch turn-off command to the driver board 13, the first power source Vin is not powered down, that is, the driver board 13 is not powered off, so the driver board 13 can respond to the touch turn-off command. That is, when the electronic device 10 enters the sleep mode, by delaying a power-down time of the first power source Vin, it may be ensured that the driver board 13 has enough time to respond to the touch turn-off command sent by the master processor 11.

In some embodiments, the first preset time T1 is related to at least one of an image refresh time, a driver board command resolution time, or a register initialization time. The image refresh time refers to a refresh time of a frame of an image when the touch panel displays images, exemplarily, the image refresh time is 16.6 ms.

In some embodiments, the first preset time T1 is greater than or equal to a sum of the image refresh time, the driver board command parsing time, and the register initialization time. It can be understood that the first preset time T1 may be set according to the image refresh time, the driver board command parsing time, and the register initialization time, thereby ensuring that the master processor 11 controls the first power source Vin to be powered down after the driver board 13 sends the response information to the master processor 11 within the first preset time T1. That is, the first preset time T1 may ensure that the driver board 13 has enough time to respond to the touch turn-off command sent by the master processor 11.

Exemplarily, the first preset time T1 is greater than or equal to 20 ms. The specific value of the first preset time is not limited in the present disclosure.

In step 403, the master processor 11 receives second response information from the driver board 13 before the driver board 13 is powered off, where the second response information is sent by the driver board 13 in response to the touch turn-off command.

According to the communication method for the electronic device provided by the present disclosure, when the electronic device 10 enters the sleep mode, the master processor 11 delays the power-down time of the first power source Vin, thereby delaying the power-off time of the driver board 13, so that the driver board 13 has enough time to respond to the touch turn-off command sent by the master processor 11. Therefore, the master processor 11 can receive the second response information from the driver board 13 before the driver board 13 is powered off, so that the master processor 11 does not consider the driver board 13 to be abnormal, and it may be ensured that the communication between the master processor 11 and the driver board 13 is normal.

Figure 6:
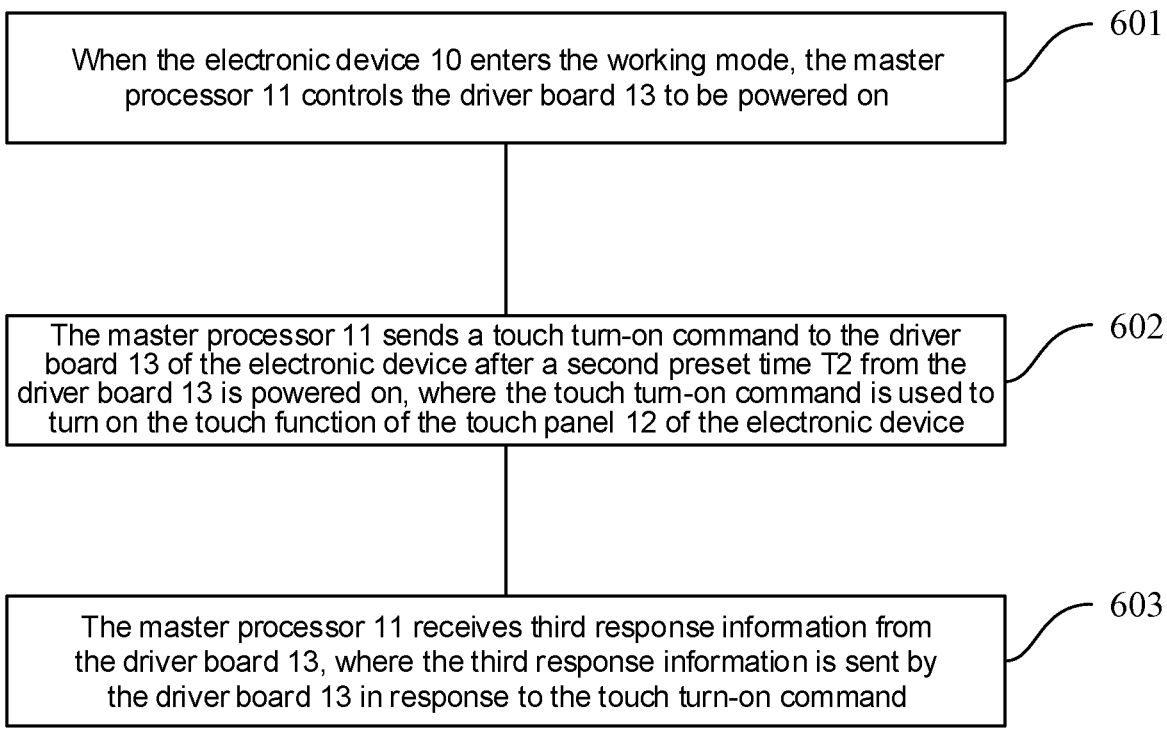
FIG. 6 is a flowchart of a communication method for another electronic device, in accordance with some embodiments.

In some embodiments, as shown in FIG. 6, the communication method for the electronic device further includes the following steps.

In step 601, when the electronic device 10 enters the working mode, the master processor 11 controls the driver board 13 to be powered on.

Exemplarily, with reference to FIG. 1, as shown in FIG. 5, considering example in which the electronic device is a notebook computer, in a third stage (stage 3), the cover plate of the notebook computer is in a closed state (lid off), and when the notebook computer enters the sleep mode, the first power source Vin is in a power-down state (off). In a fourth stage (stage 4), the cover plate of the notebook computer is opened (lid on), when the notebook computer exits from the sleep mode to enter the working mode, the master processor 11 controls the first power source Vin to be powered on, the first power source Vin is in a power-on state (on), and the driver board 13 is powered on.

In step 602, the master processor 11 sends a touch turn-on command to the driver board 13 of the electronic device after a second preset time T2 from the driver board 13 is powered on, where the touch turn-on command is used to turn on the touch function of the touch panel 12 of the electronic device.

With reference to FIG. 1, as shown in FIG. 5, since the master processor 11 sends the touch turn-on command for turning on the touch function of the touch panel 12 of the electronic device to the driver board 13 of the electronic device after the second preset time T2 from the driver board 13 is powered on, when the master processor 11 sends the touch turn-on command to the driver board 13, the first power source Vin has been powered on, that is, the driver board 13 has been powered on, so the driver board 13 may respond to the touch turn-on command. That is, when the electronic device 10 enters the working mode, by advancing the power-on time of the first power source Vin and delaying the sending time of the touch turn-on command, it may be ensured that when the master processor 11 sends the touch turn-on command, the driver board 13 can normally receive and respond to the touch turn-on command sent by the master processor 11.

In some embodiments, the second preset time T2 is related to at least one of the driver board initialization time and the register initialization time. It can be understood that the second preset time T2 may be set according to the driver board initialization time and the register initialization time, thereby ensuring that the driver board 13 has been initialized when the master processor 11 sends the touch turn-on command. In this way, the driver board 13 can receive and respond to the touch turn-on command normally, and then send the response information to the master processor 11.

In some embodiments, the second preset time T2 is greater than or equal to a sum of the driver board initialization time and the register initialization time.

Exemplarily, the second preset time is greater than or equal to 100 ms.

In step 603, the master processor 11 receives third response information from the driver board 13, where the third response information is sent by the driver board 13 in response to the touch turn-on command.

According to the communication method for the electronic device provided by the present disclosure, when the electronic device 10 enters the working mode, the master processor 11 advances the power-on time of the first power source Vin, i.e., the power-on time of the driver board 13, so that the driver board 13 can respond to the touch turn-on command before the master processor 11 sends the touch turn-on command. Therefore, the master processor 11 can receive the third response information from the driver board 13, so that the master processor 11 does not consider the driver board 13 to be abnormal, thereby ensuring normal communication between the master processor 11 and the driver board 13.

The communication method for the electronic device provided by some embodiments of the present disclosure may include step 401 to step 403, and step 601 to step 603. The sequence between performing step 401 to step 403 and performing step 601 to step 603 is not limited, that is, step 601 to step 603 may be performed after step 401 to step 403, or may be performed before step 401 to step 403.

Some embodiments of the present disclosure provide a computer-readable storage medium (for example, a non-transitory computer-readable storage medium), the computer-readable storage medium has stored a computer program instruction, and the computer program instruction, when executed on a computer (for example, a notebook computer), causes the computer to perform the communication method for the electronic device according to any of the above embodiments.

In some embodiments, firstly, the computer sends the touch turn-off command to the driver board of the computer in response to the operation of causing the computer to enter the sleep mode, where the touch turn-off command is used to turn off the touch function of the touch panel of the computer. When the computer is a notebook computer, the operation of causing the computer to enter the sleep mode may be an operation of closing the cover plate of the notebook computer by the user. Then, the computer controls the driver board to be powered off after the first preset time from sending the touch turn-off command. Finally, the computer receives the second response information from the driver board before the driver board is powered off, where the second response information is sent by the driver board in response to the touch turn-off command.

For example, the computer-readable storage medium may include, but is not limited to, a magnetic storage device (for example, a hard disk, a floppy disk, a magnetic tape, or the like), an optical disk (for example, a compact disk (CD), a DVD (digital versatile disk), or the like), a smart card, and a flash memory device (for example, an EPROM (erasable programmable read-only memory), a card, a stick, a key drive board, or the like). The various computer-readable storage media described in present disclosure may represent one or more devices and/or other machine-readable storage media for storing information. The term "machine-readable storage medium" may include, but is not limited to, wireless channels and various other media capable of storing, containing, and/or carrying instructions and/or data.

Some embodiments of the present disclosure provide a computer program product. The computer program product includes a computer program instruction, and when the computer program instructions are executed on a computer (for example, an electronic device), the computer program instructions cause the computer to perform the communication method for the electronic device according to the foregoing embodiments.

Some embodiments of the present disclosure provide a computer program. When the computer program is executed on a computer (for example, an electronic device), the computer program causes the computer to perform the communication method for the electronic device according to the foregoing embodiments.

The beneficial effects of the above computer-readable storage medium, the computer program product, and the computer program are the same as beneficial effects of the communication method for the electronic device in some embodiments, and details are not described herein again.

The above are only specific embodiments of the present disclosure, but the scope of protection of the present disclosure is not limited thereto, and any person skilled in the art may conceive of variations or replacements within the technical scope of the present disclosure, which shall fall within the protection scope of the present disclosure. Therefore, the protection scope of the present disclosure should be determined by the protection scope of the claims.

What is claimed is:

1. A driving circuit, comprising:
   a driver board configured to drive a touch panel of an electronic device;
   a master processor, the master processor being respectively coupled to the driver board and the slave processor; and
   a slave processor coupled to the driver board, the slave processor being configured to receive a control command including a first address when the driver board is in a power-off state, and send first response information in response to the control command, wherein the driver board and the slave processor sharing the first address;
   wherein the driving circuit further comprises, wherein the control command includes at least one of a touch turn-off command or a touch turn-on command, the touch turn-off command is used to turn off a touch function of the touch panel of the electronic device, and the touch turn-on command is used to turn on the touch function of the touch panel of the electronic device, wherein
   the master processor is configured to send the touch turn-off command when the electronic device is in a sleep mode, or send the touch turn-on command when the electronic device is in a working mode.

2. The driving circuit according to claim 1, wherein the slave processor is further configured to enter a sleep mode when the driver board is in a power-on state.

3. The driving circuit according to claim 1, wherein the slave processor is coupled to the driver board through a first port thereof, and the slave processor is further configured to determine that the driver board is in the power-off state when a signal of the first port is a first signal, and determine that the driver board is in a power-on state when the signal of the first port is a second signal.

4. The driving circuit according to claim 3, wherein the first signal is at a low level, and the second signal is at a high level.

5. The driving circuit according to claim 1, wherein the first address includes an inter-integrated circuit (I2C) bus address.

6. The driving circuit according to claim 1, wherein a power supply of the driver board is different from a power supply of the slave processor.

7. An electronic device, comprising: a touch panel; and the driving circuit according to claim 1, the touch panel being coupled to the driver board.

8. A communication method for an electronic device, the communication method comprising:
   sending a touch turn-off command to a driver board of the electronic device when the electronic device enters a sleep mode, the touch turn-off command being used to turn off a touch function of a touch panel of the electronic device;
   controlling the driver board to be powered off after a first preset time from sending the touch turn-off command; and
   receiving second response information from the driver board before the driver board is powered off, the second response information being sent by the driver board in response to the touch turn-off command;
   the communication method further comprises:
   controlling the driver board to be powered on when the electronic device enters a working mode;
   sending a touch turn-on command to the driver board of the electronic device after a second preset time from the driver board is powered on, the touch turn-on command being used to turn on the touch function of the touch panel of the electronic device; and
   receiving third response information from the driver board, the third response information being sent by the driver board in response to the touch turn-on command.

9. The communication method for the electronic device according to claim 8, wherein the first preset time is related to at least one of an image refresh time, a driver board command parsing time, or a register initialization time.

10. The communication method for the electronic device according to claim 9, wherein the first preset time is greater than or equal to a sum of the image refresh time, the driver board command parsing time, and the register initialization time.

11. The communication method for the electronic device according to claim 8, wherein the second preset time is related to at least one of a driver board initialization time or a register initialization time.

12. The communication method for the electronic device according to claim 11, wherein the second preset time is greater than or equal to a sum of the initialization time of the driver board and the initialization time of the register.

13. A non-transitory computer-readable storage medium, having stored computer program instructions that, when executed on a computer, cause the computer to: send a touch turn-off command to a driver board of the computer in response to an operation causing the computer to enter a sleep mode, the touch turn-off command being used to turn off a touch function of a touch panel of the computer; control the driver board to be powered off after a first preset time from sending the touch turn-off command; and receive second response information from the driver board before the driver board is powered off, the second response information being sent by the driver board in response to the touch turn-off command; the non-transitory computer-readable storage medium further having stored computer program instructions that, when executed on a computer, cause the computer to: control the driver board to be powered on when the electronic device enters a working mode; send a touch turn-on command to the driver board of the electronic device after a second preset time from the driver board is powered on, the touch turn-on command being used to turn on the touch function of the touch panel of the electronic device; and receive third response information from the driver board, the third response information being sent by the driver board in response to the touch turn-on command.

14. A computer program product, comprising computer program instructions which are stored in a non-transitory readable storage medium, wherein when the computer program instructions are executed on a computer, the computer program instructions cause the computer to perform the communication method for the electronic device according to claim 8.

15. The communication method for the electronic device according to claim 8, wherein the first preset time is greater than or equal to 20 ms.

16. The communication method for the electronic device according to claim 8, wherein the second preset time is greater than or equal to 100 ms.

\* \* \* \* \*